US011153160B1

(12) United States Patent
Davis et al.

(10) Patent No.: US 11,153,160 B1
(45) Date of Patent: Oct. 19, 2021

(54) ACTIVE DIRECTORY CONFIGURATION OF EXTERNAL NETWORK RESOURCES

(71) Applicant: FullArmor Corporation, Boston, MA (US)

(72) Inventors: Charles A. Davis, Sugar Land, TX (US); Danny Kim, San Jose, CA (US); Michael Hilton Manlief, Lexington, MA (US); Christopher Ryan Dixson-Boles, Montgomery Center, VT (US); Matthew Randall Sousley, Cashmere, WA (US)

(73) Assignee: FullArmor Corporation, Boston, MA (US)

( * ) Notice: Subject to any disclaimer, the term of this patent is extended or adjusted under 35 U.S.C. 154(b) by 0 days.

(21) Appl. No.: 17/099,905

(22) Filed: Nov. 17, 2020

(51) Int. Cl.
 *H04L 12/24* (2006.01)

(52) U.S. Cl.
 CPC ................................ *H04L 41/0813* (2013.01)

(58) Field of Classification Search
 CPC .. H04L 41/0813; H04L 41/0893; H04L 63/20
 USPC ......................................................... 709/222
 See application file for complete search history.

(56) References Cited

U.S. PATENT DOCUMENTS

| | | | | |
|---|---|---|---|---|
| 6,393,438 | B1* | 5/2002 | Kathrow | G06F 9/44505 |
| | | | | 705/54 |
| 2007/0244897 | A1* | 10/2007 | Voskuil | G06F 16/2308 |
| 2008/0104705 | A1* | 5/2008 | Hasbun | H04L 63/104 |
| | | | | 726/26 |

FOREIGN PATENT DOCUMENTS

EP         2659624 B1 *   4/2017    ......... H04L 12/4641

OTHER PUBLICATIONS

Netwrix, How to Detect Changes to Organizational Units and Groups in Active Directory, Sep. 2, 2019, Netwrix.com, https://web.archive.org/web/20190902161208/https://www.netwrix.com/how_to_detect_changes_to_organizational_units_and_groups_in_active_directory.html (Year: 2019).*
SDM Software, SDM software GPAA version 2.5 User Guide, May 2017, sdmsoftware.com, https://sdmsoftware.com/help/gpaa/2.51/GPAA2.5%20User%20Guide.pdf (Year: 2017).*

* cited by examiner

*Primary Examiner* — Zi Ye
(74) *Attorney, Agent, or Firm* — Schwegman Lundberg & Woessner, P.A.

(57) ABSTRACT

Active Directory (AD) configuration file management described herein provides technical solutions for technical problems facing management of Linux/Unix and other Unix-like open source operating systems that use configuration files to manage systems, resources, and settings. This configuration file management may use a network-internal AD Group Policy Object (GPO) to manage these configuration files, where the configuration file management may convert the configuration files into GPOs for deployment via the AD. The use of GPO-based configuration files via AD provides the ability to manage external Linux/Unix systems. When the configuration file management agent detects a change, the configuration file is replaced with a known good configuration file based on the criterion GPO or criterion configuration file. This provides persistence of the configuration GPO and the corresponding Linux/Unix system configuration, such as to implement and enforce information security.

15 Claims, 6 Drawing Sheets

ACTIVE DIRECTORY CONFIGURATION OF EXTERNAL NETWORK RESOURCES

TECHNICAL FIELD

Embodiments of the present disclosure relate generally to enterprise computing resources and, more particularly, but not by way of limitation, to a resource access system, method, and networking protocols for enabling external network access to enterprise computing resources residing in an internal network.

BACKGROUND

Linux and other Unix-like open source operating systems may use configuration files (e.g., config files) to configure parameters and settings for user applications, server processes, and operating system settings. These configuration files may be used at initialization or during operation. Linux and other Unix-like open source operating systems may rely more heavily on configuration files than Windows and other closed-source operating systems. These configuration files are often human-editable plain text configuration files. While the use of human-editable plain text configuration files facilitates helpful configuration modification, it also facilitates potentially harmful changes that may compromise operating system security.

What is needed is an improved solution for configuration file editing and management.

Figure 1:
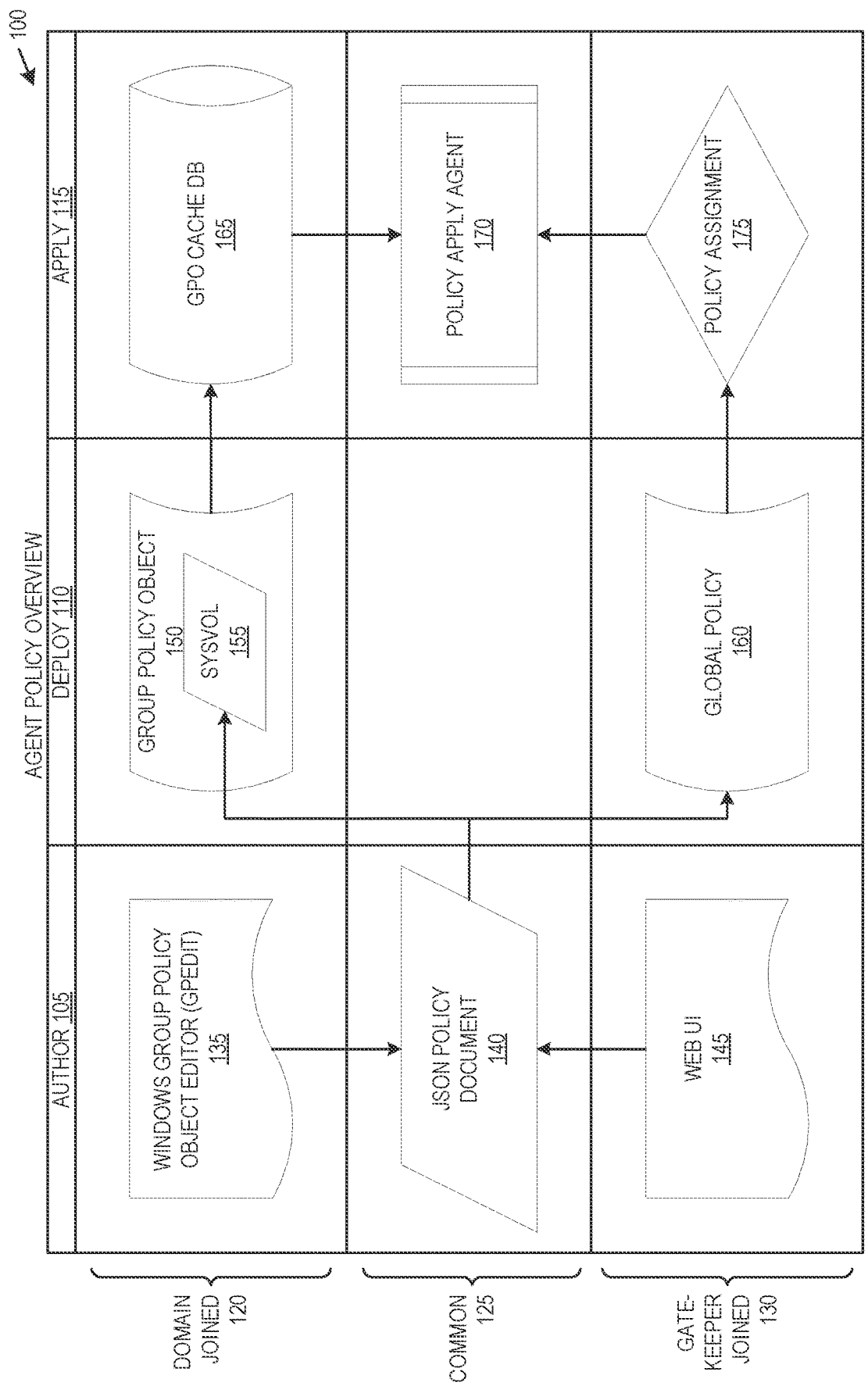
FIG. 1 is a block diagram depicting an agent configuration policy overview, according to an embodiment.

To identify the discussion of any particular element or act, the most significant digit or digits in a reference number refer to the figure number in which that element is first introduced.

Further, like numbers indicate like components.

DETAILED DESCRIPTION

An Active Directory (AD) configuration file management described herein provides technical solutions for technical problems facing management of Linux/Unix and other Unix-like open source operating systems that use configuration files to manage systems, resources, and settings. While embodiments of the configuration file management are described herein with respect to Linux/Unix systems, these systems and methods may be applied to other Unix-like open source operating systems. This configuration file management may use a network-internal AD Group Policy Object (GPO) to manage these configuration files. In particular, the configuration file management may convert the configuration files into GPOs for deployment via the AD. The use of GPO-based configuration files via AD provides the ability to manage external Linux/Unix systems (e.g., Linux/Unix systems that reside outside of an internal network).

In an example configuration file management operation, each configuration file is converted to a configuration GPO, a copy of the GPO is saved as the criterion GPO (e.g., gold standard GPO), and a copy of the GPO is deployed to an external Linux/Unix systems where the deployed GPO is converted to a deployed configuration file for use by the Linux/Unix system. A copy of the deployed GPO or a copy of the deployed configuration file may be saved by the Linux/Unix system as a criterion GPO or criterion configuration file, respectively. The deployed GPOs or deployed configuration files may be monitored using a configuration file management agent residing on the external Linux/Unix system, such as to detect any unauthorized changes. When the configuration file management agent detects a change, the configuration file is replaced with a known good configuration file based on the criterion GPO or criterion configuration file. This provides persistence of the configuration GPO and the corresponding Linux/Unix system configuration, persistence that is real-time and responsive to configuration file changes.

This AD configuration file management may be used to implement and enforce information security. Information security guidelines may be determined within an organization or may be determined and published publicly, such as guidelines and benchmarks provided by the Center for Internet Security. These information security guidelines may provide information regarding various Linux/Unix system configurations or features that may be enabled or disabled to harden that Linux/Unix system. The AD configuration file management may be used to compile and implement changes suggested by those information security guidelines into a GPO. The GPOs may be propagated to the external Linux/Unix systems and periodically reverified to ensure the intended GPO is present and correctly implemented. In an example, the GPO may harden secure shell (SSH) access to a Linux/Unix system to limit SSH access to the root account, and a local agent on the Linux/Unix system may confirm periodically that only the root account has access. This AD configuration file management provides persistence of the implementation of the information security guidelines and the corresponding Linux/Unix system configuration, persistence that is real-time and responsive to configuration file changes.

An AD Bridge may be used to provide the connection between the Linux/Unix system and an Active Directory Configuration System residing within an internal network. A Linux/Unix system residing on an external network may be unable to communicate directly with or join the internal network due to various network connection obstacles, such as Active Directory authentication requirements, firewall configurations, company information technology (IT) policies, or other network connection obstacles. The use of an AD Bridge provides the ability to register, represent, and manage these external network resources on an internal network.

The AD Bridge may include an AD Bridge Gateway, an AD Bridge Gatekeeper, and an AD Bridge Agent. The AD Bridge Gateway resides on a domain-joined server inside the internal network, and serves AD Bridge operations through the AD Gatekeeper to the AD Agent. The AD Bridge Gatekeeper resides external to the internal network (e.g., domain network), and provides routing services between the AD Bridge Gateway and the AD Bridge Agent. The AD Bridge Agent resides on each network-external Linux/Unix system, and provides the connection of the host external network resource through the AD Bridge Gatekeeper and through the AD Bridge Gateway to the internal network. Each of the AD Bridge Gateway, AD Bridge Gatekeeper, and AD Bridge Agent may reside on physical or logical devices, and may be referred to as a Gateway device, a Gatekeeper device, and an Agent device, respectively. The AD Bridge further provides the ability to create, manage, and deploy Linux configuration files as Group Policy Objects (GPOs) via Native Active Directory or Group Policy. By representing these Linux/Unix systems as native devices and applications in Active Directory, the AD Bridge provides the ability to manage these Linux/Unix systems, allowing for centralized management of configuration files.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIG. 1 is a block diagram depicting an agent configuration policy overview 100, according to an embodiment. Policy overview 100 may include various process groups, such as an authorship process group 105, a deployment process group 110, and an application process group. Each of the process groups may be applicable to various network groups, including a domain-joined network group 120, a common network group 125, and a gatekeeper-joined network group 130. A user may generate or modify a configuration file and convert the file to a GPO, such as using the Windows group policy editor (e.g., GPEDIT) 135 on a domain-joined system. In an example, the group policy editor may be augmented to include configuration files and deploy files specific to a Linux/Unix system configuration. A user may also generate or modify a configuration file and convert the file to a GPO using a web user interface (UI) 145 on a gatekeeper-joined system.

The GPO may be provided as a JavaScript Object Notation (JSON) policy document 140 to a group policy object 150, where it may be stored as System Volume (SysVol) data 155. The SysVol data 155 may be stored in a GPO cache database 165, from which the GPO is retrieved a used by a policy application agent 170 to apply the GPO policy. In another example, the GPO may be provided as a JSON policy document 140 to a global policy 160. The GPO may be used in a policy assignment decision 175, where it may be deployed to the policy application agent 170 to apply the GPO policy.

Figure 2:
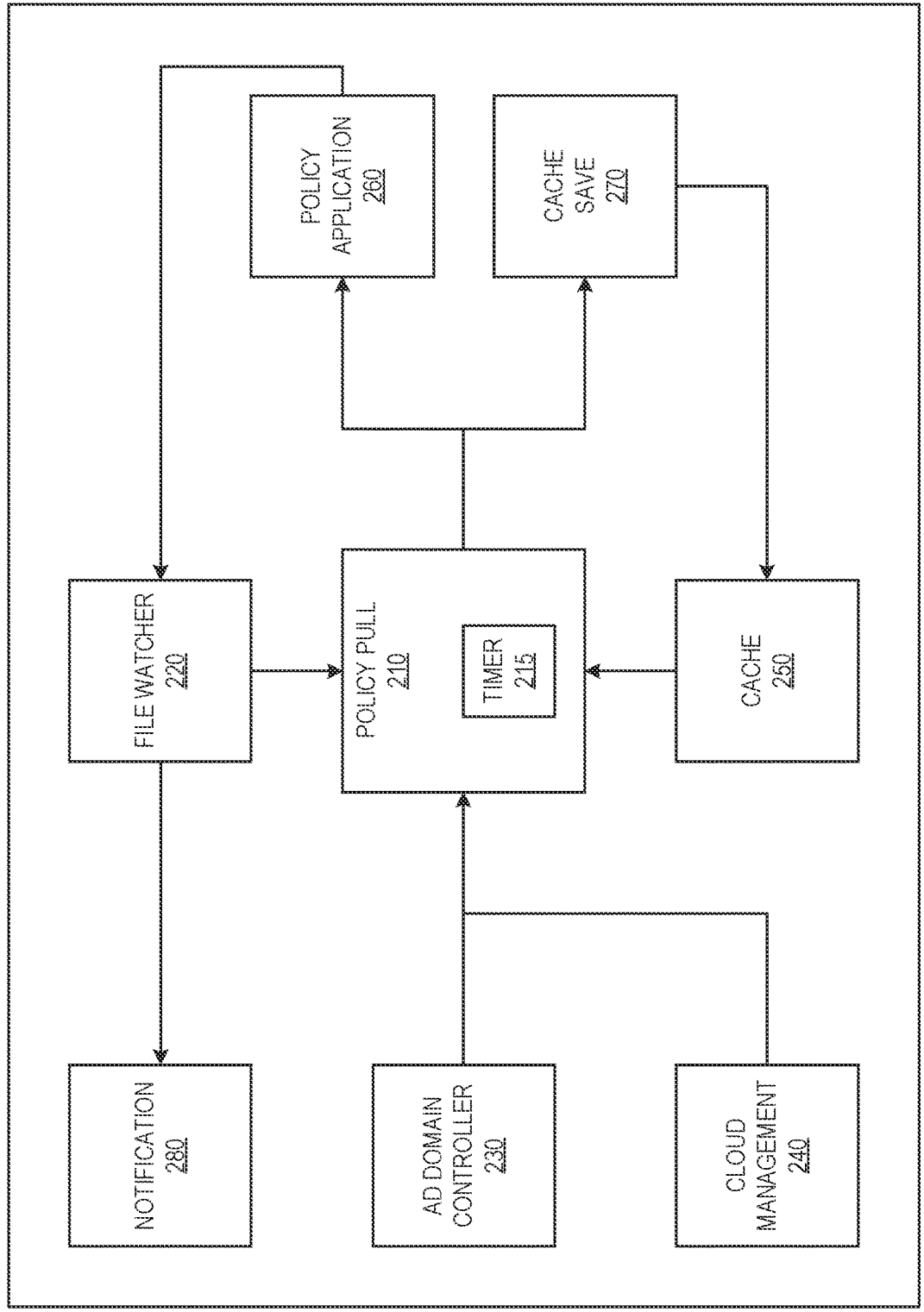
FIG. 2 is a block diagram depicting an agent configuration policy workflow, according to an embodiment.

FIG. 2 is a block diagram depicting an agent configuration policy workflow 200, according to an embodiment. Policy workflow 200 may be implemented on an AD Agent device, such as an AD Agent device residing in an external network. The AD Agent may initiate a policy pull 210 to request a new GPO, where the GPO includes one or more configuration files. The policy pull 210 may be responsive to a policy pull timer 215 expiring, such as a sixty second timer or responsive to a file watcher 220 detecting a change in local GPO files or configuration files.

The file watcher 220 may be used to detect unauthorized changes to configuration files. For example, if a third party changes a configuration file in an attempt to gain unauthorized access to the AD Agent device, the file watcher 220 may detect the configuration file change and initiate the policy pull 210 in response to detecting the configuration file change. The file watcher 220 may operate by detecting a change to a GPO or configuration file itself, or may operate by detecting a difference in file metadata. The file metadata may include a file checksum, a file hash, a file modification time, or other information about the file. In an example, a known good configuration file hash may be generated for each configuration file, and the file watcher 220 may hash the current set of configuration files and compare the newly generated file hashes to the known good configuration file hashes. In another example, the file watcher 220 may compare the changed configuration file with a known good copy of the configuration file, and may update only the changed lines within the changed configuration file. File watcher 220 may be implemented as a file watcher service may be used to register the configuration files associated with GPOs as files to be watched, such as using .Net Core API (FileSystemWatcher). The file watcher 220 may create a notification for changes detected in the registered files, and the notification may be directed to the policy pull 210. In response to receiving a notification from the file watcher 220, the policy pull 210 may initialize a timer 215 to wait an additional sixty seconds for additional events before checking for a new GPO.

The policy pull 210 may pull the GPO from an AD domain controller 230 or from cloud management 240. If the GPO cannot be pulled from the domain controller 230 or from cloud management 240, such as if they are unavailable or the network is down, the policy pull 210 may pull a copy of the GPO from the cache 250. In an example, the policy pull 210 may first attempt to pull the GPO from an AD domain controller 230 or from cloud management 240, and if that is unsuccessful, may revert to pulling the GPO from cache 250.

Once the policy pull 210 has received a copy of the GPO, a policy application 260 may apply one or more configuration files or policies provided by the GPO. For example, the GPO may include a criterion configuration file, and the policy application 260 may include saving a copy of the criterion configuration file in a configuration file location and causing the corresponding service to read and apply the copy of the criterion configuration file. The policy application 260 may include causing the configuration file to be reread, or causing a process associated with the configuration file to be restarted. A cache save 270 may be used to save the GPO or one or more configuration files to cache 250. Subsequently, the GPO or configuration files stored in cache 250 may be used by the policy pull 210 to provide a known good GPO or configuration file, as described above.

A notification 280 may be provided to indicate that there has been a change to a GPO or to a configuration file. The notification 280 may be provided by the file watcher 220, such as in response to detecting a change in GPO or configuration file or a change in file metadata. The notification 280 may be used write an event to a system log, and may be used to notify a user at the AD Agent device or other AD devices. If file watcher 220 compares individual lines within configuration files, the notification 280 may include an indication of which lines were changed, improving the ability of an operator to diagnose the change and prevent future changes.

Figure 3:
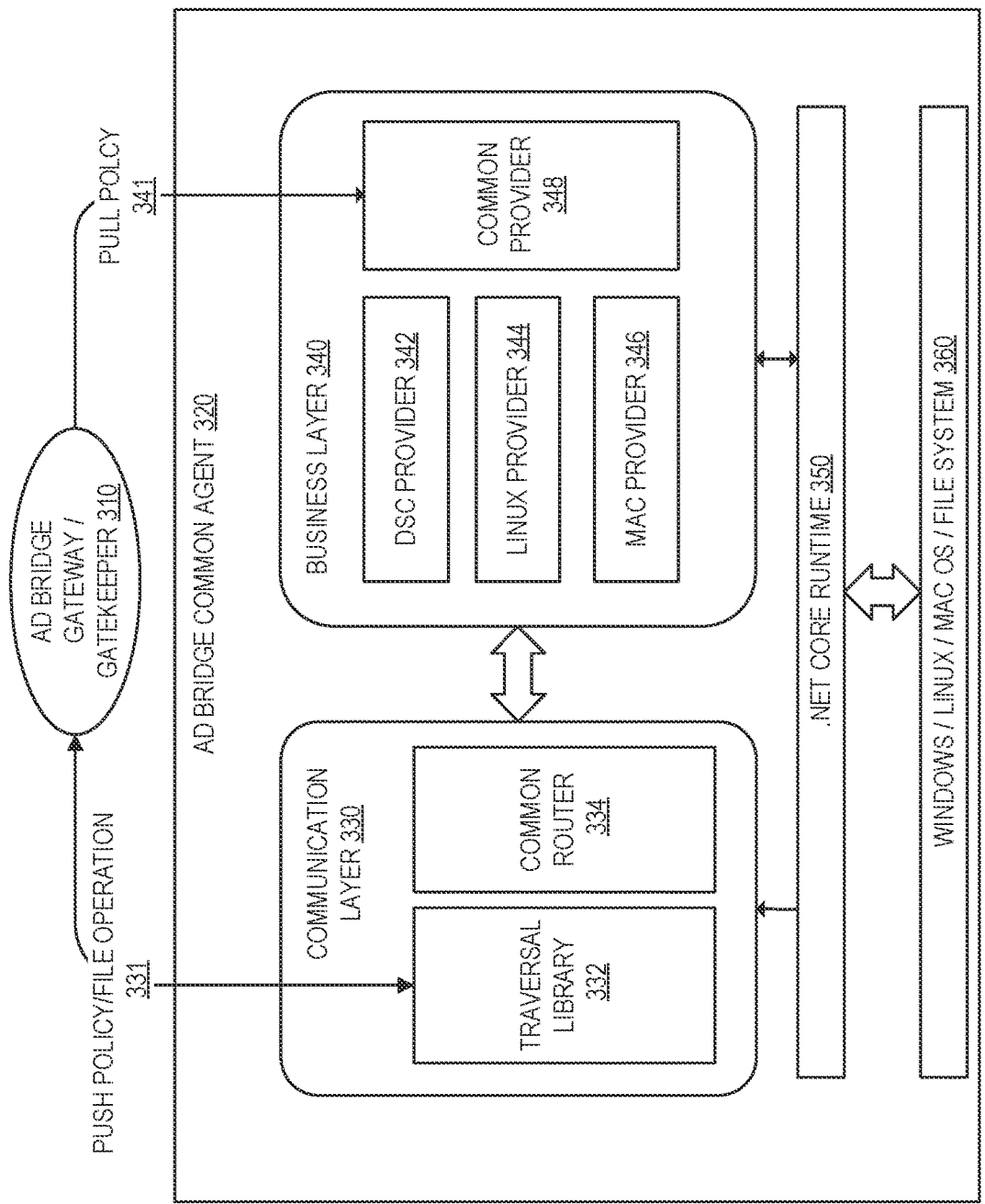
FIG. 3 is a block diagram depicting an AD Bridge topology, according to an embodiment.

FIG. 3 is a block diagram depicting an AD Bridge topology 300, according to an embodiment. The AD Bridge topology 300 may include an AD Bridge Gateway/Gatekeeper 310 inside a network, and an AD Bridge common Agent 320 outside the network. The AD Bridge common Agent 320 may be outside the network, and at least a portion of the AD Bridge Gateway/Gatekeeper 310 may be cloud-based or within a demilitarized zone (DMZ) (e.g., screened subnet, perimeter network) of a network. The AD Bridge Gateway/Gatekeeper 310 may include a multi-tenant routing service provider serving the AD Bridge Gateway/Gatekeeper 310 and one or more AD Bridge common agents 320. In an embodiment, the AD Bridge Gateway/Gatekeeper 310 may run on a domain-joined Windows server inside a domain network, where the AD Bridge Gateway/Gatekeeper 310 runs a service using privileged account settings, such as administrator or service account with elevated privileges.

The AD Bridge common Agent 320 may be used to connect the host (e.g., host machine, host device, host OS) to the AD Bridge environment via the AD Bridge Gateway/Gatekeeper 310. The AD Bridge common Agent 320 can run on various operating systems, such as Windows, Linux, UNIX, Mac OS, VM, or container. The AD Bridge common Agent 320 may include a communication layer 330, where the communication layer 330 includes a traversal library 332 and a common router 334. The communication layer may be used via a push policy or file operation 331 with the AD Bridge Gateway/Gatekeeper 310 to keep the communication alive through one or more firewalls, such as using NAT traversal. The AD Bridge common Agent 320 may include a business layer 340, where the business layer may include a DSC provider 342, a Linux provider 344, a Mac OS provider 346, and a common provider 348. The common provider 348 may rationalize requests with the other providers 342-146, such as via a pull policy 341 with the AD Bridge Gateway/Gatekeeper 310. The communication layer 330 and business layer 340 may communicate with a .NET core runtime 350, which in turn communicates with the host file system 360, such as a Widows file system, Linux file system, or Mac OS file system.

Figure 4:
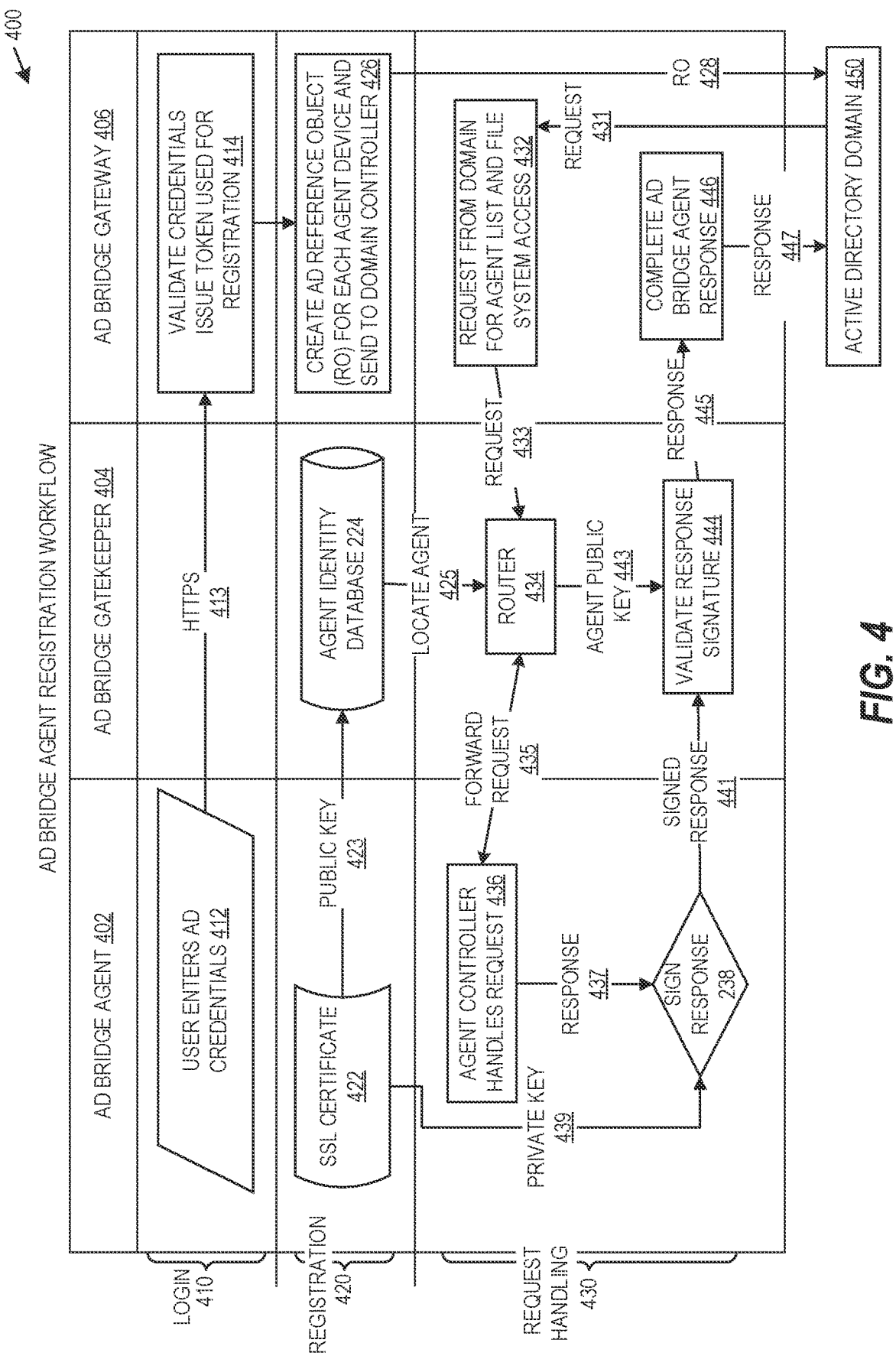
FIG. 4 is a block diagram depicting an AD Bridge Agent registration workflow, according to an embodiment.

FIG. 4 is a block diagram depicting an AD Bridge Agent registration workflow 400, according to an embodiment. Workflow 400 includes operations on various platforms, such as an AD Bridge Agent 402, an AD Bridge Gatekeeper 404, and an AD Bridge Gateway 406. In an embodiment, Agent 402 runs in the cloud, Gatekeeper 404 runs in the cloud or on-premise, and Gateway 406 runs on-premise. The Gateway 406 may be in communication with the Gatekeeper 404 through one or more network perimeter devices (not separately shown), such as a firewall device (e.g., a device that prohibits some network traffic but allows other traffic). Workflow 400 may include various groups of operations, such as login 410, registration 420, and request handling 430. Login 410 may include a user entering AD credentials 412, such as during installation of the AD Bridge. The credentials may be shared via HTTPs 413 from Agent 402 via Gatekeeper 404 to Gateway 406, where the credentials are validated and a token is used for registration 414. An AD reference object (RO) is created for each Agent device and sent 426 to domain controller 450. A request 431 is made from the domain to the Gateway 406 for Agent list and file system access 432. The request 433 may be forwarded from the Gateway 406 to a router 434 on Gatekeeper 404. The request may be forwarded 435 to an Agent controller 436 on Agent 402, which forwards a response for response signing 438. A SSL certificate 422 may be generated by Agent 402, which provides a private key 439 for response signing 438. A public key 423 may also be provided to an Agent identity database 424 on Gatekeeper 404, which provides locate Agent information 425 to router 434. Router 434 may provide an Agent public key 443, which may be combined with a signed response 441 to validate response signature 444. Once validated, a response 445 may be provided to the Gateway 406 completing the AD Bridge Agent response 446. A response 447 may be sent from the Gateway 406 to the Active Directory domain 450.

In an embodiment, the AD Bridge Gatekeeper 404 is deployed on a Gatekeeper device, and subsequently the AD Bridge Gateway 406 is installed internally on a domain-joined Windows server, where the AD Bridge Gateway 406 runs a web service to provide access via representational state transfer (REST) application programming interfaces (APIs). The AD Bridge Gateway 406 registers with the AD Bridge Gatekeeper 404 to establish a communication path, where the communication path does not use or require a VPN. Once the communication path is established, the AD Bridge Gateway 406 is now able to communicate directly with the internal domain controller. In an embodiment, the AD Bridge Gateway 406 may run with elevated privileges. Now that the AD Bridge Gateway 406 and AD Bridge Gatekeeper 404 are running and have a trust relationship established for communication, one or more external AD Bridge agents 402 can be installed and configured using AD virtual joining, such as described further below.

The AD Bridge Agent 402 may be installed running as a service with credentials from the internal domain. The authentication of the service may use authentication described in U.S. Pat. No. 9,450,944 entitled "System and Method for Pass-Through Authentication," or using authentication described in U.S. Pat. No. 9,509,684 entitled "System and Method for Resource Access with Identity Impersonation," the contents of which are hereby incorporated by reference in their entirety. The authentication enables the Agent 402 to register and establish a trust relationship with the Gatekeeper 404 and Gateway 406 associated with that customer domain.

Once the Agent 402 is authenticated and registered with the Gatekeeper 404 and Gateway 406, the Agent 402 can now access internal resources. Internal resource access may be provided as described in U.S. Pat. No. 9,762,563 entitled "Resource Access System and Method," the contents of which are hereby incorporated by reference in their entirety. The Agent 402 may initiate the Gateway 406 to generate a "share" representing each Agent, and then publish the generated shares to the domain controller. This generation and publication of shares establishes bi-directional access of resources between the internal domain and the Agent 402 through the Gateway 406, such as via REST API calls. This allows the Agent OS and file system to be accessed and managed from native internal AD tools as if it were a locally joined AD device or service. In various embodiments, this design allows for various numbers of gatekeepers 404 and gateways 406, such as many-to-one Gateway 406 to Gatekeeper 404 or many-to-one Agent 402 to Gateway 406 configurations.

Once the workflow 400 is complete, various scenarios may be used to provide management of these external resources using native AD Group Policy, such as Agent and agentless cloud resource management. Management may provide for the translation of GPOs into a readable format by non-domain joined computers. Management may include systems or methods described in U.S. Pat. No. 8,935,365 entitled "Group Policy Framework," the contents of which are hereby incorporated by reference in their entirety. Management provides the ability to translate a GPO into a common file format that is delivered to the external Agent device, where the translated GPO may be used to implement settings or report compliance. In an embodiment, this includes provides an enforcement component in the business layer that reports to the AD indicating that the Agent is in compliance or not in compliance. The Gateway 406 and Agent 402 may handle noncompliance, where the Agent 402 may create a table that it monitors on the device, and the Agent routine will reset the settings and create an audit and alert event or create a system event for notification purposes. This may be used when a company is required to undergo an audit, and may be used to tie the notification into the security software notification. This provides the ability to manage external non-AD connected devices or services using GPOs and native Group Policy, which is distinct from solutions that simply take Group Policy objects from on-premise AD and deliver those Group Policy objects to non-AD connected devices, users, or applications from an alternative distribution point (e.g., from the cloud).

Software Architecture

It should be noted that the present disclosure can be carried out as a method and embodied in a system. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-4 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the systems and methods described herein in different contexts from this disclosure.

Figure 5:
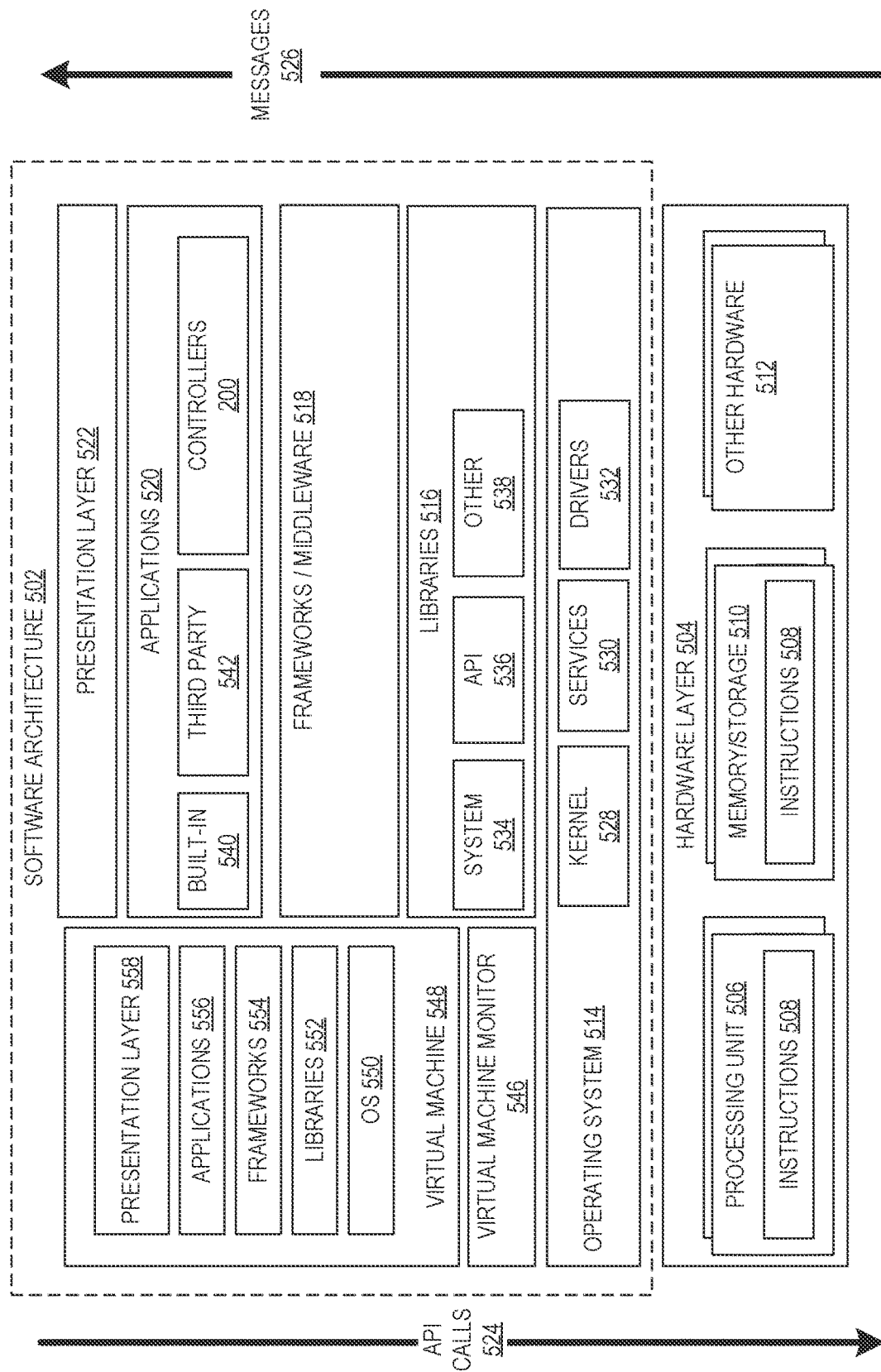
FIG. 5 is a block diagram illustrating a representative software architecture, according to an embodiment.

FIG. 5 is a block diagram 500 illustrating a representative software architecture 502, which may be used in conjunction with various hardware architectures described herein to provide the Active Directory Bridge 300, or any of the various components thereof (e.g., the Agent, Gatekeeper, Gateway), described herein. FIG. 5 is merely a non-limiting example of a software architecture and it will be appreciated that many other architectures may be implemented to facilitate the functionality described herein. The software architecture 502 may be executing on hardware such as machine 600 of FIG. 6 that includes, among other things, processors 610, memory 630, and I/O components 650. A representative hardware layer 504 is illustrated and can represent, for example, the machine 600 of FIG. 6. The representative hardware layer 504 comprises one or more processing units 506 having associated executable instructions 508. Executable instructions 508 represent the executable instructions of the software architecture 502, including implementation of the methods, modules and so forth of the subject matter described herein. Hardware layer 504 also includes memory or storage modules 510, which also have executable instructions 508. Hardware layer 504 may also comprise other hardware as indicated by 512 which represents any other hardware of the hardware layer 504, such as the other hardware illustrated as part of machine 600.

In the example architecture of FIG. 5, the software 502 may be conceptualized as a stack of layers where each layer provides particular functionality. For example, the software 502 may include layers such as an operating system 514, libraries 516, frameworks/middleware 518, applications 520 and presentation layer 522. Operationally, the applications 520 or other components within the layers may invoke application programming interface (API) calls 524 through the software stack and receive a response, returned values, and so forth illustrated as messages 526 in response to the API calls 524. The layers illustrated are representative in nature and not all software architectures have all layers. For example, some mobile or special purpose operating systems may not provide a frameworks/middleware layer 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 or other components or layers. The libraries 516 typically provide functionality that allows other software modules to perform tasks in an easier fashion than to interface directly with the underlying operating system 514 functionality (e.g., kernel 528, services 530 or drivers 532). The libraries 516 may include system 534 libraries (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be used by the applications 520 or other software components/modules. For example, the frameworks 518 may provide various graphic user interface (GUI) functions, high-level resource management, high-level location services, and so forth. The frameworks 518 may provide a broad spectrum of other APIs that may be used by the applications 520 or other software components/modules, some of which may be specific to a particular operating system or platform.

The applications 520 include built-in applications 540 or third-party applications 542. Examples of representative built-in applications 540 may include, but are not limited to, a contacts application, a browser application, a book reader application, a location application, a media application, a messaging application, an endpoint application, one or more controllers, a directory service, Gateway applications, Gatekeeper applications, or a game application. Third party applications may include any of the built-in applications as well as a broad assortment of other applications. In a specific example, the third-party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 542 may invoke the API calls 524 provided by the mobile operating system such as operating system 514 to facilitate functionality described herein.

The applications 520 may use built in operating system functions (e.g., kernel 528, services 530 or drivers 532), libraries (e.g., system 534, APIs 536, and other libraries 538), frameworks or middleware 518 to create user interfaces to interact with users of the system. Alternatively, or additionally, in some systems interactions with a user may occur through a presentation layer, such as presentation layer 522. In these systems, the application/module "logic" can be separated from the aspects of the application/module that interact with a user.

Some software architectures use virtual machines. In the example of FIG. 5, this is illustrated by virtual machine 548. A virtual machine creates a software environment where applications/modules can execute as if they were executing on a hardware machine (such as the machine of FIG. 6, for example). A virtual machine is hosted by a host operating system (operating system 514 in FIG. 5) and typically, although not always, has a virtual machine monitor 546, which manages the operation of the virtual machine as well as the interface with the host operating system (i.e., operating system 514). A software architecture executes within the virtual machine such as an operating system 550, libraries 552, frameworks/middleware 554, applications 556 or presentation layer 558. These layers of software architecture executing within the virtual machine 548 can be the same as corresponding layers previously described or may be different.

In the example embodiment, controllers operate as an application(s) in the applications 520 layer. However, in some embodiments, the controllers may operate in other software layers, or in multiple software layers (e.g., framework 518 and application 520), or in any architecture that enables the systems and methods as described herein.

Figure 6:
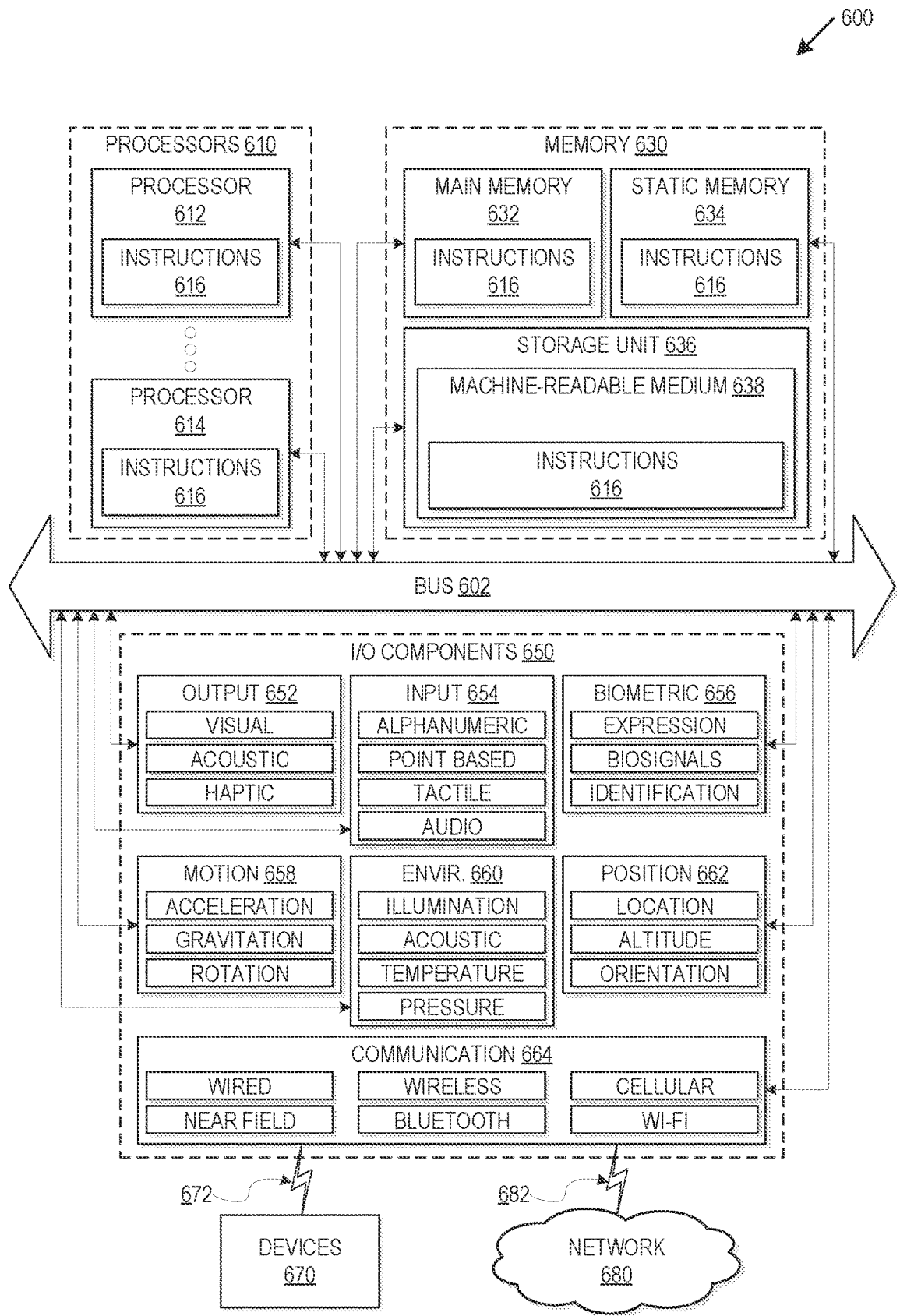
FIG. 6 is a block diagram illustrating components of a machine, according to an embodiment.

FIG. 6 is a block diagram illustrating components of a machine 600, according to an example embodiment, able to read instructions from a machine-readable medium 638 (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), position-sensing components, and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and using any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultrabooks, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"GATEWAY" in this context refers to a computing device, application, or system that performs operations as described herein, and not strictly operations associated with typical network gateways. Typical network gateways enable the passing of network traffic between multiple networks, sometimes performing network protocol conversion or translation between two different protocols. Typical proxy devices, applications, or systems act as an agent, or a substitute actor for performing an operation on behalf of another. The term gateway, as used herein, is not meant to limit the operations of the described devices, applications, or systems to that of a typical network gateway. Rather, the gateways described herein may perform operations similar to network gateways, proxies, or any other operations as described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Example 1 is an Active Directory configuration system for configuring an external network resource, the system comprising: an Active Directory (AD) Bridge Gateway device residing in a first network; an AD Bridge Gatekeeper device residing in a second network, the second network external to the first network, the AD Bridge Gatekeeper device in networked communication with the AD Bridge Gateway device; and an AD Bridge Agent residing on an external network resource in a third network, the third network external to the second network and to the first network, the external network resource joined to the first network via an AD Bridge, the AD Bridge Agent device including a memory and a processor, wherein the AD Bridge Agent device processor is configured to: receive a configuration Group Policy Object (GPO), the configuration GPO including a criterion configuration file; store the criterion configuration file in the memory; apply a copy of the criterion configuration file within the external network resource; detect a change in the copy of the criterion configuration file; and overwrite the copy of the criterion configuration file with a new copy of the criterion configuration file.

In Example 2, the subject matter of Example 1 optionally includes the AD Bridge Agent device processor further configured to: generate a criterion file hash based on the criterion configuration file; and generate a file copy hash based on the copy of the criterion configuration file; wherein the detection of the change in the copy of the criterion configuration file is based on a comparison between the criterion file hash and the file copy hash.

In Example 3, the subject matter of any one or more of Examples 1-2 optionally include the AD Bridge Agent device processor further configured to execute a file watcher service to monitor the copy of the criterion configuration file, wherein the detection of the change in the copy of the criterion configuration file is based on a file watcher notification generated by the file watcher service.

In Example 4, the subject matter of any one or more of Examples 1-3 optionally include the AD Bridge Agent device processor further configured to initiate an initial request for the configuration GPO prior to the receiving of the configuration GPO.

In Example 5, the subject matter of Example 4 optionally includes wherein the initiation of the initial request for the configuration GPO is responsive to an expiration of a GPO timer.

In Example 6, the subject matter of any one or more of Examples 4-5 optionally include wherein the initiation of the initial request for the configuration GPO is responsive to the detection of the change in the copy of the criterion configuration file.

In Example 7, the subject matter of any one or more of Examples 4-6 optionally include the AD Bridge Agent device processor further configured to initiate a subsequent request for a newer GPO.

In Example 8, the subject matter of Example 7 optionally includes the AD Bridge Agent device processor further configured to: receive a newer GPO, the newer GPO including a newer configuration file; and store the newer configuration file in the memory; wherein the overwriting of the copy of the criterion configuration file with a new copy of the criterion configuration file includes overwriting of the copy of the criterion configuration file with the newer configuration file.

In Example 9, the subject matter of any one or more of Examples 7-8 optionally include the AD Bridge Agent device processor further configured to: receive an indication that a newer GPO is unavailable; and retrieve the criterion configuration file from the memory; wherein the overwriting of the copy of the criterion configuration file with a new copy of the criterion configuration file includes overwriting of the copy of the criterion configuration file with the criterion configuration file from the memory.

In Example 10, the subject matter of any one or more of Examples 7-9 optionally include wherein the memory within the AD Bridge Agent device includes a memory cache.

In Example 11, the subject matter of any one or more of Examples 1-10 optionally include the AD Bridge Agent device processor further configured to generate, responsive to the detection of the change in the copy of the criterion configuration file, a notification for a system administrator.

In Example 12, the subject matter of any one or more of Examples 1-11 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 13, the subject matter of Example 12 optionally includes wherein the first network boundary includes a network perimeter device to prohibit at least a portion of network traffic traversing the first network boundary.

In Example 14, the subject matter of Example 13 optionally includes wherein the second network includes a perimeter network associated with the first network.

Example 15 is an Active Directory configuration method for configuring an external network resource, the method comprising: receiving a configuration Group Policy Object (GPO) at an Active Directory (AD) Bridge Agent residing on an external network resource, the configuration GPO including a criterion configuration file; applying a copy of the criterion configuration file within the external network resource; detecting a change in the copy of the criterion configuration file; and overwriting the copy of the criterion configuration file with a new copy of the criterion configuration file.

In Example 16, the subject matter of Example 15 optionally includes wherein: the GPO is received at the AD Bridge agent from an AD Bridge Gateway device through an AD Bridge Gatekeeper device; the AD Bridge Gateway device resides in a first network; the AD Bridge Gatekeeper device resides in a second network, the second network external to the first network, the AD Bridge Gatekeeper device in networked communication with the AD Bridge Gateway device; and the AD Bridge Agent resides in a third network, the third network external to the second network and to the first network, the external network resource unable to directly join the first network.

In Example 17, the subject matter of any one or more of Examples 15-16 optionally include generating a criterion file hash based on the criterion configuration file; and generating a file copy hash based on the copy of the criterion configuration file; wherein the detection of the change in the copy of the criterion configuration file is based on a comparison between the criterion file hash and the file copy hash.

In Example 18, the subject matter of any one or more of Examples 15-17 optionally include executing a file watcher service to monitor the copy of the criterion configuration file, wherein the detection of the change in the copy of the criterion configuration file is based on a file watcher notification generated by the file watcher service.

In Example 19, the subject matter of any one or more of Examples 15-18 optionally include initiating an initial request for the configuration GPO prior to the receiving of the configuration GPO.

In Example 20, the subject matter of Example 19 optionally includes wherein the initiation of the initial request for the configuration GPO is responsive to an expiration of a GPO timer.

In Example 21, the subject matter of any one or more of Examples 19-20 optionally include wherein the initiation of the initial request for the configuration GPO is responsive to the detection of the change in the copy of the criterion configuration file.

In Example 22, the subject matter of any one or more of Examples 19-21 optionally include initiating a subsequent request for a newer GPO.

In Example 23, the subject matter of Example 22 optionally includes receiving a newer GPO, the newer GPO including a newer configuration file; and storing the newer configuration file; wherein the overwriting of the copy of the criterion configuration file with a new copy of the criterion configuration file includes overwriting of the copy of the criterion configuration file with the newer configuration file.

In Example 24, the subject matter of any one or more of Examples 22-23 optionally include receiving an indication that a newer GPO is unavailable; and retrieving the criterion configuration file; wherein the overwriting of the copy of the criterion configuration file with a new copy of the criterion configuration file includes overwriting of the copy of the criterion configuration file with the criterion configuration file.

In Example 25, the subject matter of any one or more of Examples 22-24 optionally include wherein a memory within the AD Bridge Agent device includes a memory cache for storing the criterion configuration file.

In Example 26, the subject matter of any one or more of Examples 15-25 optionally include generating, responsive to the detection of the change in the copy of the criterion configuration file, a notification for a system administrator.

In Example 27, the subject matter of any one or more of Examples 15-26 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 28, the subject matter of Example 27 optionally includes wherein the first network boundary includes a network perimeter device to prohibit at least a portion of network traffic traversing the first network boundary.

In Example 29, the subject matter of Example 28 optionally includes wherein the second network includes a perimeter network associated with the first network.

Example 30 is one or more machine-readable medium including instructions, which when executed by a computing system, cause the computing system to perform any of the methods of Examples 15-25.

Example 31 is an apparatus comprising means for performing any of the methods of Examples 15-25.

Example 32 is at least one non-transitory machine-readable storage medium, comprising a plurality of instructions that, responsive to being executed with processor circuitry of a computer-controlled device, cause the computer-controlled device to: receive a configuration Group Policy Object (GPO) at an Active Directory (AD) Bridge Agent residing on an external network resource, the configuration GPO including a criterion configuration file; apply a copy of the criterion configuration file within the external network resource; detect a change in the copy of the criterion configuration file; and overwrite the copy of the criterion configuration file with a new copy of the criterion configuration file.

In Example 33, the subject matter of Example 32 optionally includes wherein: the GPO is received at the AD Bridge agent from an AD Bridge Gateway device through an AD Bridge Gatekeeper device; the AD Bridge Gateway device resides in a first network; the AD Bridge Gatekeeper device resides in a second network, the second network external to the first network, the AD Bridge Gatekeeper device in networked communication with the AD Bridge Gateway device; and the AD Bridge Agent resides in a third network, the third network external to the second network and to the first network, the external network resource unable to directly join the first network.

In Example 34, the subject matter of any one or more of Examples 32-33 optionally include the instructions further causing the computer-controlled device to: generate a criterion file hash based on the criterion configuration file; and generate a file copy hash based on the copy of the criterion configuration file; wherein the detection of the change in the copy of the criterion configuration file is based on a comparison between the criterion file hash and the file copy hash.

In Example 35, the subject matter of any one or more of Examples 32-34 optionally include the instructions further causing the computer-controlled device to execute a file watcher service to monitor the copy of the criterion configuration file, wherein the detection of the change in the copy of the criterion configuration file is based on a file watcher notification generated by the file watcher service.

In Example 36, the subject matter of any one or more of Examples 32-35 optionally include the instructions further causing the computer-controlled device to initiate an initial request for the configuration GPO prior to the receiving of the configuration GPO.

In Example 37, the subject matter of Example 36 optionally includes wherein the initiation of the initial request for the configuration GPO is responsive to an expiration of a GPO timer.

In Example 38, the subject matter of any one or more of Examples 36-37 optionally include wherein the initiation of the initial request for the configuration GPO is responsive to the detection of the change in the copy of the criterion configuration file.

In Example 39, the subject matter of any one or more of Examples 36-38 optionally include the instructions further causing the computer-controlled device to initiate a subsequent request for a newer GPO.

In Example 40, the subject matter of Example 39 optionally includes the instructions further causing the computer-controlled device to: receive a newer GPO, the newer GPO including a newer configuration file; and store the newer configuration file; wherein the overwriting of the copy of the criterion configuration file with a new copy of the criterion configuration file includes overwriting of the copy of the criterion configuration file with the newer configuration file.

In Example 41, the subject matter of any one or more of Examples 39-40 optionally include the instructions further causing the computer-controlled device to: receiving an indication that a newer GPO is unavailable; and retrieving the criterion configuration file; wherein the overwriting of the copy of the criterion configuration file with a new copy of the criterion configuration file includes overwriting of the copy of the criterion configuration file with the criterion configuration file.

In Example 42, the subject matter of any one or more of Examples 39-41 optionally include wherein a memory within the AD Bridge Agent device includes a memory cache for storing the criterion configuration file.

In Example 43, the subject matter of any one or more of Examples 32-42 optionally include the instructions further causing the computer-controlled device to generate, responsive to the detection of the change in the copy of the criterion configuration file, a notification for a system administrator.

In Example 44, the subject matter of any one or more of Examples 32-43 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 45, the subject matter of Example 44 optionally includes wherein the first network boundary includes a network perimeter device to prohibit at least a portion of network traffic traversing the first network boundary.

In Example 46, the subject matter of Example 45 optionally includes wherein the second network includes a perimeter network associated with the first network.

Example 47 is an Active Directory configuration apparatus for configuring an external network resource, the apparatus comprising: means for receiving a configuration Group Policy Object (GPO) at an Active Directory (AD) Bridge Agent residing on an external network resource, the configuration GPO including a criterion configuration file; means for applying a copy of the criterion configuration file within the external network resource; means for detecting a change in the copy of the criterion configuration file; and means for overwriting the copy of the criterion configuration file with a new copy of the criterion configuration file.

In Example 48, the subject matter of Example 47 optionally includes wherein: the GPO is received at the AD Bridge agent from an AD Bridge Gateway device through an AD Bridge Gatekeeper device; the AD Bridge Gateway device resides in a first network; the AD Bridge Gatekeeper device resides in a second network, the second network external to the first network, the AD Bridge Gatekeeper device in networked communication with the AD Bridge Gateway device; and the AD Bridge Agent resides in a third network, the third network external to the second network and to the first network, the external network resource unable to directly join the first network.

In Example 49, the subject matter of any one or more of Examples 47-48 optionally include means for generating a criterion file hash based on the criterion configuration file; and means for generating a file copy hash based on the copy of the criterion configuration file; wherein the detection of the change in the copy of the criterion configuration file is based on a comparison between the criterion file hash and the file copy hash.

In Example 50, the subject matter of any one or more of Examples 47-49 optionally include means for executing a file watcher service to monitor the copy of the criterion configuration file, wherein the detection of the change in the copy of the criterion configuration file is based on a file watcher notification generated by the file watcher service.

In Example 51, the subject matter of any one or more of Examples 47-50 optionally include means for initiating an initial request for the configuration GPO prior to the receiving of the configuration GPO.

In Example 52, the subject matter of Example 51 optionally includes wherein the initiation of the initial request for the configuration GPO is responsive to an expiration of a GPO timer.

In Example 53, the subject matter of any one or more of Examples 51-52 optionally include wherein the initiation of the initial request for the configuration GPO is responsive to the detection of the change in the copy of the criterion configuration file.

In Example 54, the subject matter of any one or more of Examples 51-53 optionally include means for initiating a subsequent request for a newer GPO.

In Example 55, the subject matter of Example 54 optionally includes means for receiving a newer GPO, the newer GPO including a newer configuration file; and means for storing the newer configuration file; wherein the means for overwriting of the copy of the criterion configuration file with a new copy of the criterion configuration file includes means for overwriting of the copy of the criterion configuration file with the newer configuration file.

In Example 56, the subject matter of any one or more of Examples 54-55 optionally include means for receiving an indication that a newer GPO is unavailable; and means for retrieving the criterion configuration file; wherein the means for overwriting of the copy of the criterion configuration file with a new copy of the criterion configuration file includes means for overwriting of the copy of the criterion configuration file with the criterion configuration file.

In Example 57, the subject matter of any one or more of Examples 54-56 optionally include wherein a memory within the AD Bridge Agent device includes a memory cache for storing the criterion configuration file.

In Example 58, the subject matter of any one or more of Examples 47-57 optionally include means for generating, responsive to the detection of the change in the copy of the criterion configuration file, a notification for a system administrator.

In Example 59, the subject matter of any one or more of Examples 47-58 optionally include wherein: the AD Bridge Gatekeeper device is in networked communication with the AD Bridge Gateway device through a first network boundary; the AD Bridge Agent is in networked communication with the AD Bridge Gatekeeper device through a second network boundary; and the first network boundary provides greater network security than the second network boundary.

In Example 60, the subject matter of Example 59 optionally includes wherein the first network boundary includes a network perimeter device to prohibit at least a portion of network traffic traversing the first network boundary.

In Example 61, the subject matter of Example 60 optionally includes wherein the second network includes a perimeter network associated with the first network.

Example 62 is one or more non-transitory machine-readable medium including instructions, which when executed by a machine, cause the machine to perform operations of any of the operations of Examples 1-61.

Example 63 is an apparatus comprising means for performing any of the operations of Examples 1-61.

Example 64 is a system to perform the operations of any of the Examples 1-61.

Example 65 is a method to perform the operations of any of the Examples 1-61.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An Active Directory configuration system for configuring an external network resource, the system comprising:
    an Active Directory (AD) Bridge Gateway server device residing in a first network;
    an AD Bridge Gatekeeper device residing in a second network, the second network external to the first network, the AD Bridge Gatekeeper device in networked communication with the AD Bridge Gateway server device; and
    an AD Bridge Agent client device residing in a third network, the third network external to the second network and to the first network, the AD Bridge Agent client device joined to the first network via an AD Bridge, the AD Bridge Agent client device including a memory and a processor, wherein the AD Bridge Agent client device processor is configured to:
    receive a configuration Group Policy Object (GPO), the configuration GPO including a known good criterion configuration file;
    store the known good criterion configuration file in the memory of the AD Bridge Agent client device;
    store a copy of the known good criterion configuration file as a local configuration file in the memory of the AD Bridge Agent client device;
    apply the local configuration file within the AD Bridge Agent client device;
    generate a criterion file hash based on the known good criterion configuration file;
    generate a file copy hash based on the local configuration file;
    detect, at the AD Bridge Agent client device, a change in the local configuration file based on a comparison between the criterion file hash and the file copy hash; and
    responsive to the detection of the change in the local configuration file, overwrite the local configuration file with the known good criterion configuration file.

2. The system of claim 1, the AD Bridge Agent client device processor further configured to execute a file watcher service to monitor the local configuration file, wherein the detection of the change in the local configuration file is based on a file watcher notification generated by the file watcher service.

3. The system of claim 1, the AD Bridge Agent client device processor further configured to initiate an initial request for the configuration GPO prior to the receiving of the configuration GPO.

4. The system of claim 3, wherein the initiation of the initial request for the configuration GPO is responsive to the detection of the change in the local configuration file.

5. The system of claim 3, the AD Bridge Agent client device processor further configured to initiate a subsequent request for a newer GPO.

6. The system of claim 5, the AD Bridge Agent client device processor further configured to:
    receive a newer GPO, the newer GPO including a newer configuration file; and
    store the newer configuration file in the memory of the AD Bridge Agent client device;
    wherein the overwriting of the local configuration file with the known good criterion configuration file includes overwriting of the local configuration file with the newer configuration file.

7. The system of claim 5, the AD Bridge Agent client device processor further configured to:
    receive an indication that the newer GPO is unavailable; and
    retrieve the known good criterion configuration file from the memory of the AD Bridge Agent client device;
    wherein the overwriting of the local configuration file with the known good criterion configuration file includes overwriting of the local configuration file with the known good criterion configuration file retrieved from the memory.

8. An Active Directory configuration method for configuring an external network resource, the method comprising:
receiving a configuration Group Policy Object (GPO) at an Active Directory (AD) Bridge Agent client device from an AD Bridge Gateway server device through an AD Bridge Gatekeeper device, the configuration GPO including a known good criterion configuration file, wherein the AD Bridge Gateway server device resides in a first network, the AD Bridge Gatekeeper device resides in a second network external to the first network, the AD Bridge Agent client device resides in a third network external to the second network and to the first network, and the AD Bridge Agent client device unable to directly join the first network;
storing a copy of the known good criterion configuration file as a local configuration file in a memory at the AD Bridge Agent client device;
applying the local configuration file within the AD Bridge Agent client device;
generating a criterion file hash based on the known good criterion configuration file;
generating a file copy hash based on the local configuration file;
detecting, at the AD Bridge Agent client device, a change in the local configuration file based on a comparison between the criterion file hash and the file copy hash; and
responsive to the detection of the change in the local configuration file, overwriting the local configuration file with a new local configuration file.

9. The method of claim 8, further including executing a file watcher service to monitor the local configuration file, wherein the detection of the change in the local configuration file is based on a file watcher notification generated by the file watcher service.

10. The method of claim 8, further including initiating an initial request for the configuration GPO prior to the receiving of the configuration GPO.

11. The method of claim 10, wherein the initiation of the initial request for the configuration GPO is responsive to the detection of the change in the local configuration file.

12. The method of claim 10, further including initiating a subsequent request for a newer GPO.

13. The method of claim 12, further including:
receiving a newer GPO, the newer GPO including a newer configuration file; and
storing the newer configuration file in the memory at the AD Bridge Agent client device;
wherein the overwriting of the local configuration file with the known good criterion configuration file includes overwriting of the local configuration file with the newer configuration file.

14. The method of claim 12, further including:
receiving an indication that a newer GPO is unavailable; and
retrieving the known good criterion configuration file from the memory at the AD Bridge Agent client device;
wherein the overwriting of the local configuration file with a new local configuration file includes overwriting of the local configuration file with the known good criterion configuration file retrieved from the memory.

15. At last one non-transitory machine-readable storage medium, comprising a plurality of instructions that, responsive to being executed with processor circuitry of a computer-controlled device, cause the computer-controlled device to:
receive a configuration Group Policy Object (GPO) at an Active Directory (AD) Bridge Agent residing on an AD Bridge Agent client device from an AD Bridge Gateway server device through an AD Bridge Gatekeeper device, the configuration GPO including a known good criterion configuration file, wherein the AD Bridge Gateway server device resides in a first network, the AD Bridge Gatekeeper device resides in a second network external to the first network, the AD Bridge Agent client device resides in a third network external to the second network and to the first network, and the AD Bridge Agent client device unable to directly join the first network;
store a copy of the known good criterion configuration file as a local configuration file at the AD Bridge Agent client device;
apply the local configuration file within the AD Bridge Agent client device;
generate a criterion file hash based on the known good criterion configuration file;
generate a file copy hash based on the local configuration file;
detect, at the AD Bridge Agent client device, a change in the local configuration file based on a comparison between the criterion file hash and the file copy hash; and
responsive to the detection of the change in the local configuration file, overwrite the local configuration file with a new local configuration file.

* * * * *